US006655251B2

(12) United States Patent
Guidetti

(10) Patent No.: US 6,655,251 B2
(45) Date of Patent: Dec. 2, 2003

(54) METHOD AND DEVICE FOR CUTTING FILM-LIKE MATERIALS, FOR INSTANCE FOR AUTOMATIC PACKAGING INSTALLATIONS

(75) Inventor: Dario Guidetti, Grignasco (IT)

(73) Assignee: Cavanna SpA (IT)

(*) Notice: Subject to any disclaimer, the term of this patent is extended or adjusted under 35 U.S.C. 154(b) by 15 days.

(21) Appl. No.: 09/997,862

(22) Filed: Nov. 29, 2001

(65) Prior Publication Data

US 2002/0108476 A1 Aug. 15, 2002

(30) Foreign Application Priority Data

Feb. 9, 2001 (EP) .......................................... 01830081

(51) Int. Cl.[7] ................................................ B23D 15/12
(52) U.S. Cl. .............................. 83/602; 83/628; 83/632
(58) Field of Search .............................. 83/13, 628, 52, 83/62, 602, 528, 527, 632, 14

(56) References Cited

U.S. PATENT DOCUMENTS 2,186,884 A 1/1940 Shomaker .................... 164/43
2,712,169 A * 7/1955 Buttress ...................... 156/347
3,298,891 A 1/1967 Beck .......................... 156/519
3,695,128 A 10/1972 Gentile ............................ 83/1
4,257,295 A * 3/1981 Patel ........................... 83/374
4,463,642 A * 8/1984 Minato et al. ................ 83/530
4,679,473 A * 7/1987 Hirata et al. .................. 83/157
5,555,082 A * 9/1996 Tanaka et al. ............. 399/397
5,568,754 A * 10/1996 Chun ............................ 83/13
5,784,938 A * 7/1998 Watkins et al. ............... 83/528
5,804,031 A 9/1998 Cavanna ..................... 156/518
6,161,460 A * 12/2000 Johnson et al. ............... 83/821

FOREIGN PATENT DOCUMENTS

GB 1 558 998 1/1980

* cited by examiner

*Primary Examiner*—Allan N. Shoap
*Assistant Examiner*—Ghassem Alie
(74) *Attorney, Agent, or Firm*—Dorsey & Whitney LLP

(57) ABSTRACT

A device for cutting film-like material in a shearing action by a blade and a counterblade provided with respective cutting edges. The blade has first and second ends. Movement of the blade is controlled such that the first end and the second end move along paths that are different from, but substantially parallel, to one another. The blade moves between a separated position and a closed position. In the separated position, the cutting edges define a space through which the film-like material may advance, and the distance between the respective cutting edges is not constant along the entire blade, with the second end of the blade being closer to the counterblade than is the first end of the blade. In the closed position, the blade and the counterblade are closed on one another after cutting the film-like material with a gradual cooperative movement of the cutting edges.

14 Claims, 3 Drawing Sheets

METHOD AND DEVICE FOR CUTTING FILM-LIKE MATERIALS, FOR INSTANCE FOR AUTOMATIC PACKAGING INSTALLATIONS

The present invention relates to the cutting of film-like materials.

The solution according to the invention has been developed with particular attention paid to the possible application in automatic packaging systems, for example, for packaging foodstuffs. In particular, the present invention has been developed for possible use in machines for applying tear bands.

The corresponding prior art is extremely extensive, as is demonstrated, for instance, by documents such as IT-B-1 041 468 (to which there corresponds GB-A-1 558 998) and U.S. Pat. No. 3,298,891.

Devices of this basic, common type essentially comprise, with some variations, a ribbon of film-like wrapping material with tear bands applied to the ribbon and oriented transversely with respect to the direction of extension (and of advance) of the ribbon.

The tear bands are obtained starting from a further ribbon of film-like material that is made to advance by steps through a cutting unit. The cutting unit acts in a direction transverse to the direction of feed of the further ribbon of film-like material so as to cut from that ribbon, strips of reduced width, usually selectively variable according to the requirements of use.

The strips of material thus obtained, which are to constitute the tear bands, are then taken up by a transferring device which carries out application of the strips to the wrapping material. This application of the tear bands takes place at given distances corresponding to the dimensions of the products to be wrapped.

The main problem regarding the making of devices of the type described above is linked to the fact that the operation of cutting the tear bands is intrinsically discontinuous since it has to be performed by steps, whereas usually it is desirable that the wrapping material on which the tear bands are applied should be kept continually advancing at a practically constant speed.

The need to reconcile the intermittent operation of the cutting unit that forms the tear bands with the continuous movement of the wrapping material on which the tear bands are applied is more often than not met by adjustments to (according to various modalities) the transferring device. Usually, the transferring device will pick up the tear bands as soon as they have been formed, slowing down or stopping altogether in a position corresponding to the cutting unit, and will then follow a movement of rotation with an acceleration such that, when the tear band, carried by the transferring device, reaches the position in which it is to be transferred onto the wrapping material, it will be advancing at a speed practically corresponding to the speed that the wrapping material is advancing, which is kept continuous and constant.

Consideration of such an arrangement has become increasingly important among the critical factors considered since, according to the by now constant trend in the sector, the speed of operation of the ensemble described (expressed in general in terms of number of tear bands applied per unit time) increases as the rates of operation of the packaging plants increases.

The above-mentioned critical factors also involve the cutting unit, which is frequently built with the use of rotating blades, which may possibly cooperate with counterblades (anvils) carried by the transferring device. A solution of this type is described, for instance, in the Italian patent application for industrial invention TO96A000806.

The above cutting solutions of a dynamic type present, however, the drawback of being difficult to implement, in particular as regards the need to adjust the cutting device exactly and to regulate its operation so that it may be adapted to possible variations in the dimensions of the tear bands and/or in the thickness and nature of the film-like material from which the tear bands are cut.

In various applications that make use of film-like material that is to be cut at pre-set distances, there is already known the solution of resorting to automatic cutting devices which are able to carry out an operation of shearing. These are cutting devices that comprise a blade and a counterblade hinged together like the blades of a pair of scissors or shears.

A solution of the above kind, which is able to ensure good precision in performing the cutting operation, is, however, not applicable, except in very particular cases, to the cutting of tear bands. Usually, the tear bands are made up of very narrow strips which are cut from ribbons of film-like material, and the width of the film-like material defines the length of the tear bands. Since the cutting area ends up being somewhat long, it is necessary to use blades of corresponding extension. Precisely on account of the hinging of the blades in a position corresponding to respective proximal ends, the distal ends of the blades themselves must carry out a somewhat extensive travel, which proves far from compatible with the need to operate at ever-increasing speeds.

The purpose of the present invention is to provide a solution that is able to overcome the drawbacks of the known solutions just described.

According to the present invention, the above purpose is achieved by a cutting process having the characteristics specifically recalled in the ensuing claims. The invention also relates to the corresponding device.

The invention will now be described, purely by way of non-limiting example, with reference to the attached drawings, in which.

Figure 1:
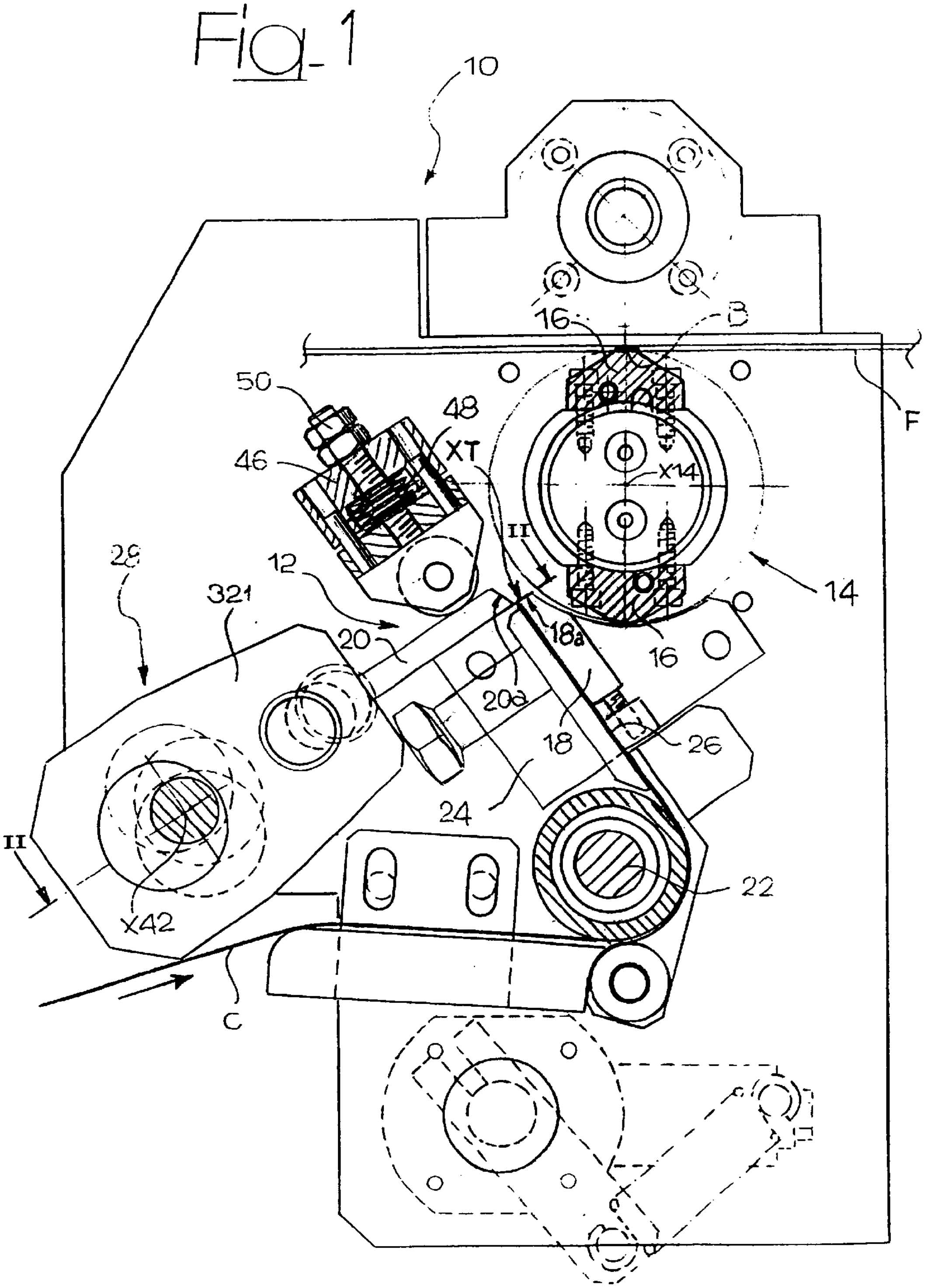
FIG. 1 illustrates, in a general side elevation, part of a device for applying tear bands, made according to the invention.

In the view of FIG. 1, the reference number 10 designates, as a whole, a device for cutting and applying tear bands, designed to be used, for example, in the context of a system for automatic packaging of products, such as foodstuffs.

According to a configuration in itself known, the device 10 is designed to be traversed by a film-like wrapping material F (which is usually made to advance at a constant speed), on which there are to be applied, at selectively identified regular distances apart, tear bands B having a width selectively identified according to the specific requirements of an application.

The tear bands B are obtained starting from a further film-like material C fed off a roll or roller (not illustrated) toward a cutting unit 12, where the film-like material C undergoes cutting in the transverse direction so as to give rise to the bands B. The bands thus formed are taken up by an applying device 14, usually consisting of a rotating structure comprising a plurality of gripping units 16 (normally operating by suction), which are designed to pick up the tear bands B from the cutting device 12 to transfer them onto the film-like material F. The foregoing corresponds to criteria of implementation and use which are altogether known in the prior art (also in different possible variant embodiments) and which, as such, do not require a detailed description herein.

From the side elevation of FIG. 1 it may be noted that the transferring device 14 rotates about a main respective axis X14 and carries, associated to it, a fixed contrast element 18. The latter element, which performs the function of counterblade, has a cutting edge 18*a*, which is usually located at a short distance from the ideal cylindrical surface along which the movement of rotation (or, to be more precise, orbital movement) of the gripping units 16 about the axis X14 takes place. In particular, the cutting edge 18*a* is approximately co-extensive with one of the generatrices of the aforesaid ideal cylindrical surface.

The reference number 20 designates a blade provided with a respective cutting edge 20*a* designed to cooperate with the cutting edge 18*a* so as to carry out cutting of the film-like material from which the tear bands B are made.

In the view of FIG. 1, the reference number 22 designates a motor-driven roller which has the function of an unwinding roller and is designed to control advance of the film-like material C by successive steps the length of which is selectively determined (in a known way) so as to correspond to the width of the tear bands that are to be made.

The reference number 24 designates a piece of supporting equipment (mounted in a fixed position with respect to the framework of the device 10) designed to define a passage or gap 26 through which the film arriving from the unwinding roller 22 can be fed regularly toward the cutting area where the cutting edges 18*a* and 20*a* act.

Figure 2:
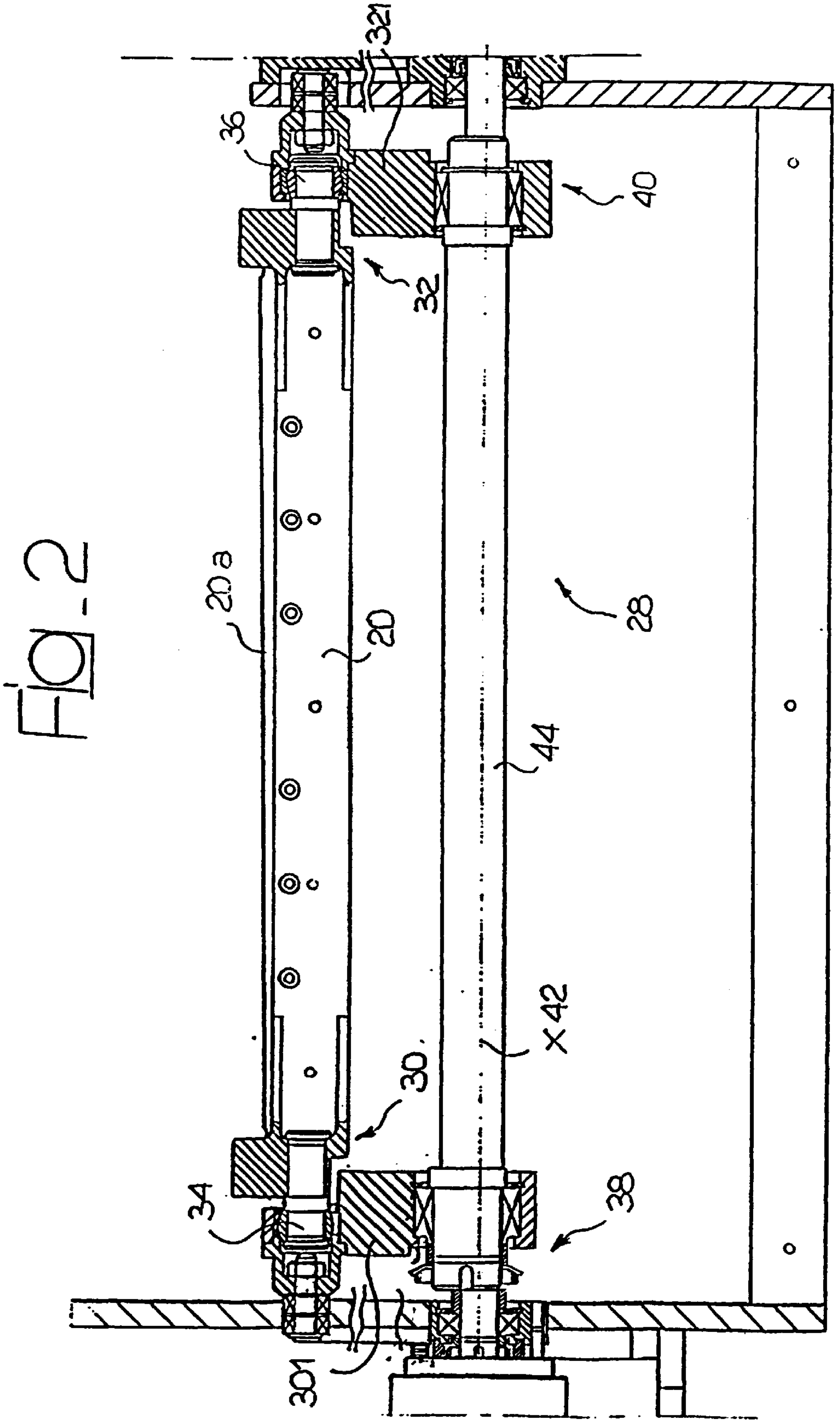
FIG. 2 is a fragmentary, cross-sectional view taken along line II—II of FIG. 1.

The blade 20 is carried by a respective piece of actuating equipment 28 (see also FIG. 2), which is basically made up of a pair of side brackets that support the blade 20 in a condition of sliding support—in a plane XT defining in practice the cutting plane (see FIG. 1)—against the equipment 24. In particular, the brackets in question support the blade 20 at points corresponding to its ends, designated by 30 and 32, respectively.

The supporting action (and, as will be more clearly seen from what follows, the controlling action) of the blade 20 takes place by means of two articulated-joint elements, such as ball-and-socket joints, 34 and 36, each of which acts between a respective end 30, 32 of the blade 20 and a corresponding bracket 301, 321 of the actuating device 28 subjected to the action of a cam assembly 38, 40.

Both of the cam assemblies 38, 40 rotate about a common axis X42 which is parallel both to the line along which the cutting edge 18*a* of the counterblade 18 extends and to the axis X14 about which the transferring device 14 rotates.

Usually, the two cam assemblies 38, 40 are mounted in phase with each other in the sense that the imaginary straight lines that connect the geometrical center of the eccentric pivot of each assembly to the common axis of rotation X42 lie in the same plane where the axis X42 lies. The distances that separate the geometrical centers of the two cam assemblies 38, 40 from the axis X42—i.e., in practice, the degrees of eccentricity of the two assemblies 38 and 40—are, however, different from one another.

For instance, in the example of embodiment illustrated herein, the degree of eccentricity of the assembly 38 is greater than the degree of eccentricity of the assembly 40 (of course, this relationship could be reversed).

In this way, the set of parts just described may be mounted in such a way that the cutting edge 20*a* of the blade 20 usually presents a skewed orientation with respect to the line of extension of the cutting edge 18*a* of the counterblade 18.

In a preferred way, the position of assembly of the elements described is chosen in such a way that the cutting edge 20*a* (and the blade 20 as a whole) lies on a generatrix of the orbital path described by the gripping elements 16 about the axis X14 only when the cam assemblies 38 and 40 are in the position of rotation such that the geometrical centers of the respective eccentric pivots are in the position of maximum approach to the transferring device 14. In other words, only in this condition (i.e., the one to which, as will appear more clearly in what follows, FIG. 5 refers), the cutting edge 20*a* extends along a straight line substantially parallel to the axis of rotation X14 of the transferring device 14.

As a result of being mounted on the cam assemblies 38, 40 and of the different degree of eccentricity of these assemblies, when the blade 20 is in the position where it is furthest away from the transferring device 14 (i.e., when the cam assemblies 38 and 40 are in an angularly opposed position—i.e., translated by 180° in their angular movement of rotation—with respect to the position described previously), the end of the blade 20 carried by the cam assembly with the greater degree of eccentricity (in the example illustrated here, it is the end 30 carried by the cam assembly 38) is, with respect to the ideal cylindrical surface on which the gripping members 16 orbit in the transferring device 14, at a distance greater than the opposite end (in the example here illustrated, the end 32) carried by the cam assembly 40. This situation is clearly recognizable in FIG. 3.

Furthermore, the dimensions of the parts involved and the degree of eccentricity of the two cam assemblies 38, 40 are chosen in such a way that, in the position just described (blade 20 in the position where it is furthest away from the transferring device 14), the end 32 of the blade 20 that is closer to the device 14, and hence to the counterblade 18, is in any case at a distance from the counterblade 18 itself sufficient to create a space that is enough to enable the film C coming from the gap 26 to advance in the space between the cutting edge 20*a* of the blade 20 and the cutting edge 18*a* and of the counterblade 18.

Figure 3:
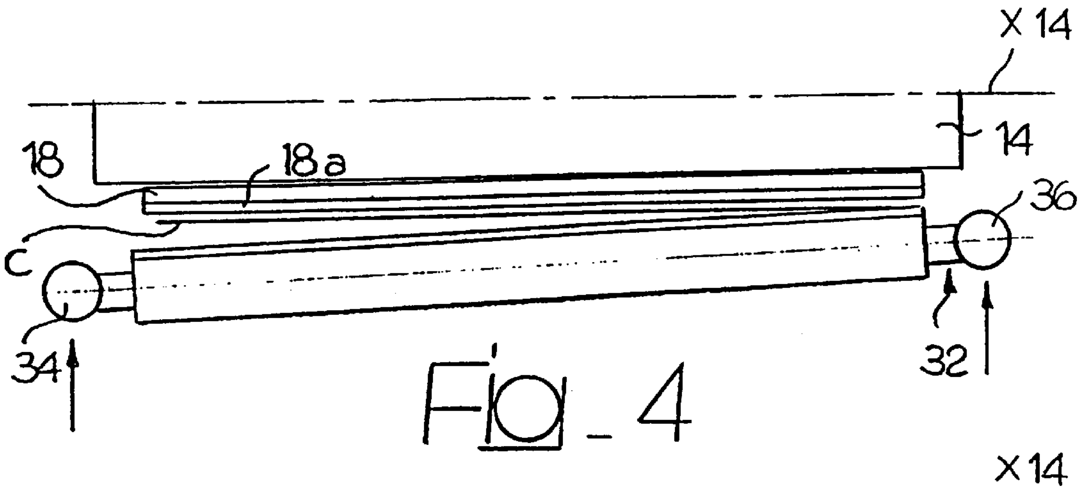
FIGS. 3 to 5 are schematic representations of successive steps of operation of a device according to the invention.
Figure 5:
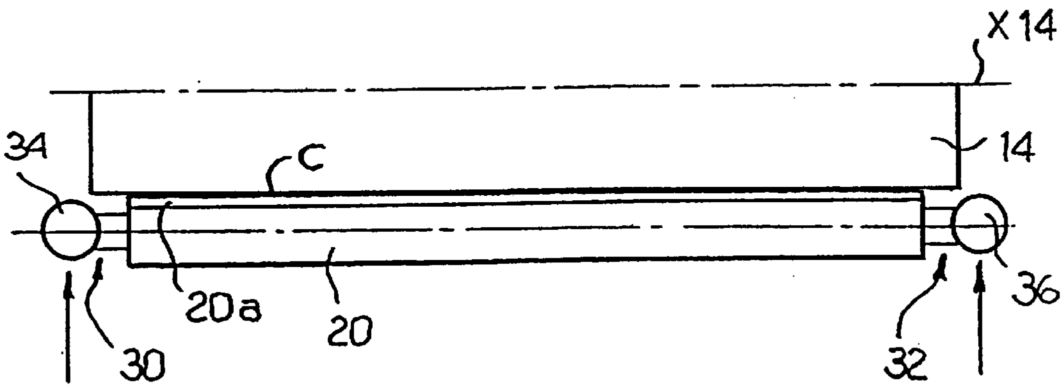

Control in rotation of the cam assemblies 38 and 40 about the axis X42, driven by a shaft 44 operated by a motor (not shown, but of a known type) enables forward and backward movement of the blade 20 between the two end positions described previously (i.e., a position where the blade is furthest away from the transferring device 14, see FIG. 3, and a position where the blade is closest to the transferring device 14, see FIG. 5).

The rotational movement of the shaft 44 is coordinated with the movement of the feed roller 22 in such a way that, when the blade 20 is furthest away from the transferring device 14, as described previously, the feed roller 22 causes the film C to advance in the area between the cutting edges 18*a* and 20*a* by a distance of advance corresponding to the width of the tear bands that are to be cut. Movement of the film C is not hindered by the blade 20 and by the counterblade 18, which at this point are in any case separated from one another.

Once the condition described has been reached, as a result of the rotation of the cam assemblies 38 and 40 driven by the shaft 44, the blade 20 starts advancing again toward the transferring device 14.

Figure 4:
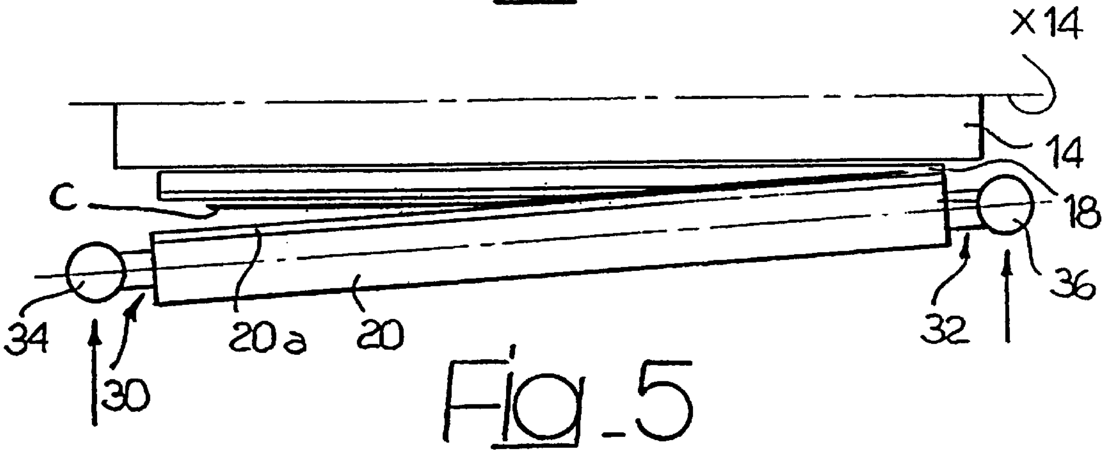

The above movement may be controlled both continuously and intermittently by causing the shaft 44 to rotate accordingly. In any case, the movement in question causes the blade 20 and the counterblade 18 to interact, carrying out the cutting of a tear band starting from the film-like material C (see FIG. 4).

Precisely on account of the different degree of eccentricity of the two assemblies 38 and 40, the closing movement of the cutting edges 20*a* and 18*a* on the film-like material C is obtained (as represented schematically in FIG. 4) starting from the ends of the cutting edges 18*a* and 20*a* located in positions corresponding to the assembly 40 having smaller eccentricity, toward the opposite ends located in a position corresponding to the assembly 38 having greater eccentricity.

This fact is immediately understandable if it is borne in mind that, when the blade 20 is in the position where it is furthest away from the transferring assembly 14, the end 32 carried by the assembly 40 is, with respect to the transferring device 14, at a smaller distance as compared to the end 30 carried by the assembly 38 (see again FIG. 3).

Instead, when the blade 20 has reached the position where it is closest to the assembly 14, it is with its cutting edge 20*a* set practically parallel to the axis X14 in a condition where the edge is substantially tangent to the ideal cylindrical surface along which the orbital movement of the gripping elements 16 takes place (FIG. 5).

The movement of cutting the film C thus takes place according to a typical shearing action, but without hinging of the blades 20 and 18 on a common axis.

The result described (it will be appreciated that the representation of FIGS. 3 to 5 has been deliberately emphasized for reasons of clarity of illustration) is in fact achievable by imparting on the ends 30 and 32 of the blade 20 substantially linear and parallel travel paths: in particular, it is possible to impart on the end 30 carried by the cam assembly 38 a travel (measured in the cutting plane XT—see FIG. 1) only slightly greater than the amplitude of the corresponding travel imparted on the opposite end 32.

In this way, a drawback that is intrinsic in the solutions based upon the use of cutting blades which are hinged together according to a general scissors configuration is overcome.

The gripping units 16 of the transferring device 14 may pick up the part of film-like material C that has just undergone cutting (see, once again, FIG. 5) with an orientation that is substantially parallel to the direction of extension of the cutting edge 18*a* of the counterblade 18, hence precisely in a position corresponding to the ideal cylindrical surface on which the orbital movement of the aforesaid elements 16 takes place.

At the end of the cutting operation, the cutting edge 20*a* of the blade 20 is in fact oriented in a direction that is substantially parallel to the aforesaid direction of picking-up.

The movement of the blade 20 described previously can be controlled in a highly precise way both with respect to the rate (which can be regulated by adjusting the speed of rotation, which may possibly be modulated as has already been said, of the assemblies 38 and 40 about the axis X42) and the amount of travel imparted on the two ends of the blade (an amount that may be determined a priori by defining the degrees of eccentricity of the assemblies 38 and 40), and also with respect to the possible adjustment of any pre-loading imparted on the blade 20 in view of its cooperation with the counterblade 18.

In this connection, it has proved preferable to resort to solutions which, with respect to the relative spatial location of the axis X42 and the region of cooperation of the cutting edges 18*a*, 20*a* (hence, of the cutting plane XT), will avoid any stresses that might result in jamming of the two cutting edges.

Recourse to solutions that tend to locate the axis X42 so that it coincides or substantially coincides with the plane XT in which the relative movement of the cutting edges 18*a*, 20*a* is performed has proved particularly advantageous. A solution that has proved preferential is the one in which the axis X42 is displaced at least slightly with respect to the plane XT on the side where the counterblade 18 is found. In this way, the action of controlling the blade 20 by means of the cam assemblies 38 and 40 is obtained in such a way as to counter any tendency toward jamming of the blade 20 against the counterblade 18. The pre-loading deemed necessary in order to ensure a proper cutting action (also accounting for the specific characteristics of the film C) can thus be adjusted with precision. This may be obtained by means of a pressure element 46—preferably acting under the action of a load spring 48 with a selectively adjustable pre-loading by means of a screw-type adjustment member 50—which acts on the blade 20 or on the elements carrying the blade 20.

Of course, without prejudice to the principle of the invention, the details of implementation and the embodiments may vary widely with respect to what is described and illustrated herein, without thereby departing from the scope of the present invention as defined in the annexed claims. This applies in particular to the possibility of imparting on the ends of a blade, such as a blade 20, a movement of the type described previously, by resorting, instead of to cam assemblies, to linear actuators subjected to a control function—operated, for example, by means of a digital control device—chosen, for instance, in such a way as to impart on the ends a movement that substantially resembles a harmonic motion.

What is claimed is:

1. A device for cutting film-like material as a result of a shearing action performed by a blade and a counterblade provided with respective cutting edges acting in a cutting plane, said blade having a first blade end and a second blade end, said device comprising an actuating assembly for actuating said blade and adapted to control movement of said blade such that said first blade end moves along a first path and said second blade end moves along a second path, wherein said first path and said second path are substantially parallel to one another, and wherein said blade is thereby moved between a separated position, in which said respective cutting edges define a space through which said film-like material is adapted to advance, and in which said cutting edge of said blade is located at a first distance from said cutting edge of said counterblade at said first blade end, and in which said blade is located at a second distance from said cutting edge of said counterblade at said second blade end, wherein said first distance is greater than said second distance; and a closed position, in which said blade and said counterblade are closed on one another after cutting of said film-like material with a cooperative movement of said cutting edges, wherein said cooperative movement is performed in a gradual way starting from said second blade end toward said first blade end; and a pressure element for applying on said blade a pre-loading toward said counterblade, wherein said pressure element comprises an adjustment member for selectively adjusting said pre-loading.

2. The device according to claim 1, wherein said pressure element acts under the action of a load spring.

3. The device according to claim 1, wherein said adjustment member is a screw-type adjustment element.

4. A device for cutting film-like material as a result of a shearing action performed by a blade and a counterblade provided with respective cutting edges acting in a cutting plane, said blade having a first blade end and a second blade end, and said cutting edge of said blade extending between said first blade end and said second blade end, said device comprising an actuating assembly for actuating said blade and adapted to control movement of said blade such that said first blade end moves along a first path and said second blade end moves along a second path, wherein said first path and said second path are substantially parallel to one another, and wherein said blade is thereby moved between a separated position, in which said respective cutting edges define a space through which said film-like material is adapted to advance, and in which said cutting edge of said blade is located at a first distance from said cutting edge of said counterblade at said first blade end, and in which said blade is located at a second distance from said cutting edge of said counterblade at said second blade end, wherein said first distance is greater than said second distance; and a closed position, in which said blade and said counterblade are closed on one another after cutting of said film-like material with a cooperative movement of said cutting edges, wherein said cooperative movement is performed in a gradual way starting from said second blade end toward said first blade end;

wherein said actuating assembly further comprises at least one actuating member supporting one of said first blade end and said second blade end, and wherein said at least one actuating member is adapted to travel in a direction generally transverse to said cutting edge of said blade; and at least one articulation device, wherein said at least one articulation device articulately connects said at least one actuating member to said supported one of said first blade end and said second blade end.

5. The device according to claim 1 or claim 4, wherein said actuating assembly is adapted to control movement of said first blade end and movement of said second blade end so that said movements substantially resemble a harmonic motion.

6. The device according to claim 1, wherein said actuating assembly acts on said blade in such a way as to counter jamming of said blade against said counterblade.

7. The device according to claim 4, wherein said as least one actuating member comprises a cam assembly for controlling movement of said supported one of said first blade end and said second blade end between said separated position and said closed position.

8. The device according to claim 4, wherein said at least one actuating member comprises a first cam assembly for controlling movement of said first blade end and a second cam assembly for controlling movement of said second blade end between said separated position and said closed position.

9. The device according to claim 8, wherein said first cam assembly has a first degree of eccentricity, wherein said second cam assembly has a second degree of eccentricity, and wherein said first degree of eccentricity is different from said second degree of eccentricity.

10. The device according to claim 8, wherein said first and second cam assemblies have a common axis of rotation.

11. The device according to claim 10, wherein said first and second cam assemblies have respective first and second centers of eccentric pivots, and wherein a first straight line joining said first center of eccentric pivot to said common axis of rotation is parallel to a second straight line joining said second center of eccentric pivot to said common axis of rotation.

12. The device according to claim 4, wherein said at least one articulation device is a ball-and-socket joint.

13. The device according to claim 4, wherein said at least one actuating member comprises a first actuating member and a second actuating member, wherein said first actuating member supports said first blade end and further comprises a first cam assembly and a first bracket, and wherein said second actuating member supports said second blade end and further comprises a second cam assembly and a second bracket, and further wherein said at least one articulation device comprises a first articulation device and a second articulation device, wherein said first articulation device articulately connects said first actuating member to said first blade end, and wherein said second articulation device articulately connects said second actuating member to said second blade end.

14. The device according to claim 13, wherein said first articulation device comprises a first ball-and-socket joint and wherein said second articulation device comprises a second ball-and-socket joint, and further wherein said first ball-and-socket joint articulately connects said first blade end to said first bracket, and wherein said second ball-and-socket joint articulately connects said second blade end to said second bracket.

* * * * *